Oct. 20, 1953
A. J. BENT ET AL
2,656,018
BRAKE APPARATUS
Filed Feb. 4, 1949
2 Sheets-Sheet 2
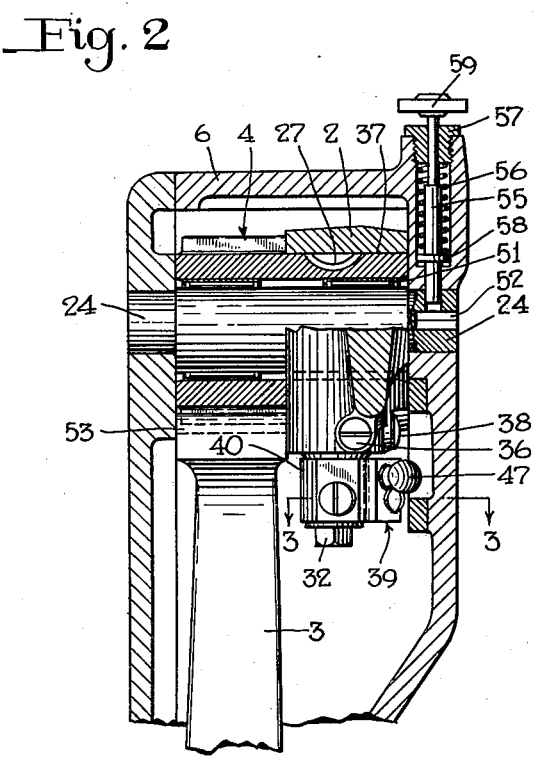
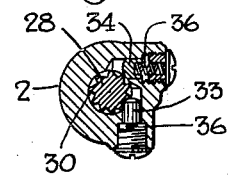
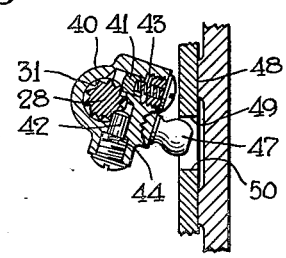
INVENTORS
Arthur J. Bent
Samuel L. Williams
BY
Frank E. Miller,
ATTORNEY Patented Oct. 20, 1953

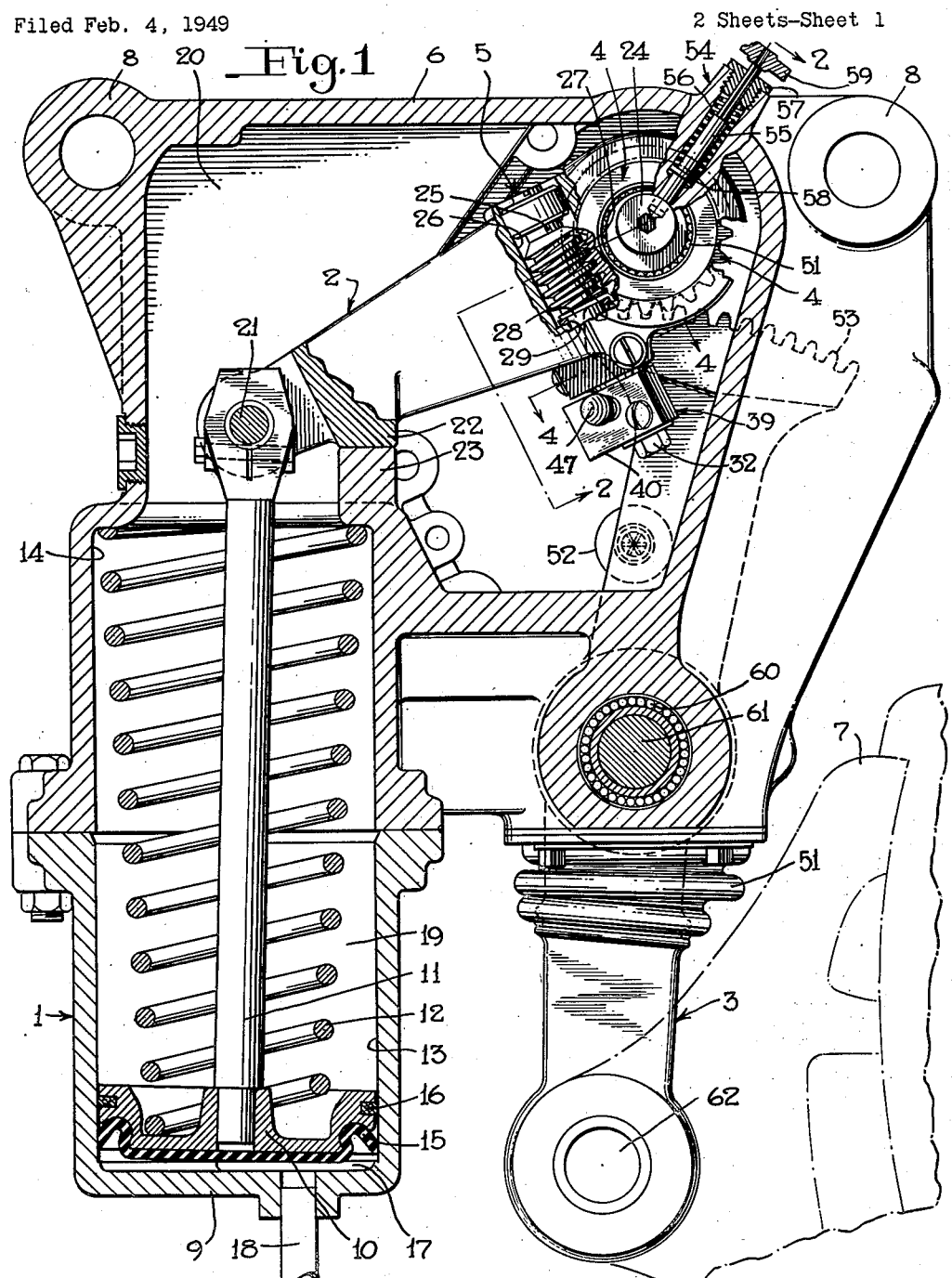

2,656,018

UNITED STATES PATENT OFFICE 2,656,018

BRAKE APPARATUS

Arthur J. Bent, Pittsburgh, Pa., and Samuel L. Williams, New York, N. Y., assignors to Westinghouse Air Brake Company, a corporation of Pennsylvania Application February 4, 1949, Serial No. 74,666

6 Claims. (Cl. 188—197)

This invention relates to brake apparatus for railway vehicles or the like and more particularly to the type embodying for braking a wheel, a brake shoe, or the like, a fluid pressure operable brake cylinder and means operably connecting the brake cylinder to the brake shoe, all arranged for mounting as a unit on the vehicle for cooperation with the respective wheel.

One object of the invention is to provide an improved unit brake apparatus of the above type.

Another object of the invention is the provision of an improved unit brake apparatus of the above type, compact of design and with all working parts enclosed to protect them from dirt and ice for insuring maximum service life and operating efficiency, with minimum of maintenance and which brake apparatus may be readily applied to or removed from a vehicle.

Other objects and advantages of the invention will be apparent from the following more detailed description thereof taken with reference to the accompanying drawings, wherein:

Fig. 1 is a sectional view taken longitudinally through a unit brake apparatus embodying the invention; Fig. 2 is a sectional view taken substantially along line 2—2—2—2 in Fig. 1; Fig. 3 is a sectional view taken along line 3—3 in Fig. 2; and, Fig. 4 is a sectional view taken along line 4—4 in Fig. 1.

Description

As shown in the drawings, the improved unit brake apparatus comprises (Fig. 1) a brake cylinder device 1, brake levers 2 and 3, a pinion gear 4, a brake shoe wear compensator device 5, a housing 6 and a brake shoe 7, which can be readily applied to or removed from a vehicle by means of suitable bolts (not shown) applied through bolting lugs 8 on the housing.

The brake cylinder device 1 comprises a cup-shaped brake cylinder body 9, a brake piston 10, a piston rod 11 and a brake release spring 12. The brake cylinder body 9 constituting preferably, a removable part of housing 6 has a suitable bore 13 in which the brake piston 10 is slidably mounted, said bore being in coaxial relationship with a housing bore 14. The brake piston 10 is provided with a cup-type packing 15 and a felt lubricating swab 16 both in sliding contact with the wall of bore 13, said packing being arranged to prevent leakage of fluid under pressure from a pressure chamber 17 formed in the body 9 between one side of piston 10 and the end wall of bore 13. Chamber 17 is open to a brake cylinder pipe 18 through which fluid under pressure may be admitted to or released from said pressure chamber.

The piston rod 11 secured at one end to piston 10 extends through a non-pressure chamber 19 at the opposite side of said piston into a chamber 20 in the housing 6 where its opposite end is pivotally connected by a pin 21 to the free end of the brake lever 2. The brake release spring 12 contained in non-pressure chamber 19 surrounds the piston rod 11 and bears at one end against the housing 6 and at the other end against the piston 10 with sufficient force for moving said piston to a brake release position in which it is shown in the drawing and which is defined by engagement of stops 22 and 23 on lever 2 and housing 6, respectively. The non-pressure chamber 19 and chamber 20 within the housing are open to atmosphere through a breather passage containing a fitting 52 for excluding insects, etc.

The lever 2 is a second class lever having as previously described, one end pivotally connected to the end of the piston rod 11, while the other end is journaled on a bearing 37 provided at one side of and integral with the pinion gear 4, said bearing and gear being journaled on an anti-friction bearing 51 mounted on an eccentric shaft 24 journaled at opposite ends in the housing. Associated with lever 2 and pinion gear 4 is the brake shoe wear compensator device 5 which connects said lever and said pinion gear such that the pinion gear is rotatable on the eccentric shaft 24 by operation of lever 2.

The brake shoe wear compensator device 5 comprises a worm gear 25 located in a suitable bore 26 provided in lever 2 at one side of and at right angles to the axis of the lever bearing 37, the teeth of said worm gear extending through the side wall of said bore into meshing relation with complementary teeth 27 formed in and around said bearing portion for thereby connecting the pinion gear 4 for rotation with said lever. The worm gear 25 has connected therewith a shaft 28, of lesser diameter than said worm gear and extending from one end thereof through a suitable bore 29 in lever 2 coaxial with bore 26 to the exterior of said lever. Shaft 28 is provided circumferentially with two spaced apart rows of ratchet teeth 30 and 31, respectively, and a suitable threaded end portion to receive a nut 32. The teeth 30 on shaft 28 are located within the bore 29 for engagement by two latching pawls 33 and 34 spaced apart around said shaft and slidably mounted in suitable bores provided in lever 2, a spring 36 in each of said bores acting on the respective pawl for urging it against said teeth.

The brake shoe wear compensator device further comprises a control mechanism 39 in turn comprising a body 40 which is journaled on shaft 28 at either side of the ratchet teeth 31, the nut 32 holding said body on said shaft. The body 40 is provided with two bores spaced apart circumferentially around the teeth 31 and containing, respectively, pawls 41 and 42 and springs 43 and 44 for urging said pawls into engagement with the teeth 31.

Pawls 41 and 42 are so spaced with respect to each other and to the teeth 31 that upon rotation in one direction of the body 40 with respect to the shaft 28, corresponding to an angular movement equivalent to one-half the pitch of said teeth, one or the other of said pawls will engage a tooth 31 to prevent rotation of the body on the shaft in the reverse direction. The pawls 33, 34 are similarly spaced for cooperation with ratchet teeth 30.

The body 40 of the control mechanism 39 further includes an operating lug 47 which extends outwardly from said body into a suitable slot provided in a plate member 48 secured to the housing 6. The slot in the plate member 48 is arranged such that when the lever 2 is moved toward brake applied position, as will hereinafter be explained, the lug 47 will engage an edge 50 of the slot for causing the body 40 to be rotated in a counterclockwise direction on shaft 28. As the brake lever 2 is returned to release position the lug 47 will engage an opposite edge 49 of the slot in member 48 to turn the body 40 in a clockwise direction, for reasons which will be explained hereinafter.

The lever 3 is pivotally mounted approximately midway between its extremities by an anti-friction bearing 60 on a pin 61 supported by the housing 6 one arm of said lever being disposed within said housing and the other outside of said housing. On the end of lever 3 disposed within housing 6 there is provided a gear sector 53, the teeth of which are adapted to mesh with the teeth in the pinion gear 4, while to the opposite end of said lever which is disposed outside of the housing the brake shoe 7 is secured by pin 62.

One end of the eccentric shaft 24 is provided with a wrench receiving socket 52 into which a suitable wrench (not shown) may be inserted for turning said shaft 24 to move the pinion gear into, and out of, driving engagement with the gear sector 53 provided on the adjacent end of the lever 3.

A locking mechanism 54 is provided for locking the eccentric shaft 24 in a position in which the pinion gear 4 engages the gear sector 53. This locking mechanism comprises a lock pin 55 arranged with a sliding fit in a bore 56 in the housing and extending into one journal of the eccentric shaft 24 so that when the pin is entered into the journal, said shaft is held against rotation. Disposed in a suitable cavity about pin 55 is a spring 56 one end of which rests against a cap nut 57 having a screw fit with the housing while the opposite end bears against a spring seat 58 on the pin 55 to urge said pin into locking position. The pin 55 extends with sliding fit through a central bore of the cap nut 57 to the outside of the housing where it is provided with a button 59 which enables manually pulling the pin 55 out of locking cooperation with eccentric shaft 24 to permit turning of said shaft by the wrench above mentioned.

A flexible sleeve 51 is secured at one end to the housing 6 about the opening through which the lever 3 extends. The other end of sleeve 51 has a sealing fit around the lever. Sleeve 51 serves to prevent dirt, water, etc. from entering the housing 6 to cause wear, rust or freezing of the mechanism.

Description of operation

Assuming that the unit brake apparatus is secured to a vehicle with the brake shoe 7 arranged for braking a wheel, or other element to be braked, and assuming the various parts of said apparatus are in a brake release position in which they are shown in the drawing, and that fluid under pressure is supplied to pressure chamber 17 of the brake cylinder 1 via pipe 18. As fluid pressure is established in chamber 17 and exceeds the opposing force of the release spring 12 the piston 10 will move against said spring and rock lever 2 in a clockwise direction. Since lever 2 is connected by the worm gear 25 to pinion 4, said pinion will likewise be rotated in a clockwise direction and by reason of the engagement of the pinion gear with segment 53, the lever 3 will be turned counter-clockwise about pin 61 to move the brake shoe 7 into braking contact with the wheel (not shown).

As lever 2 is rotated clockwise in applying the brake, the lug 47 of the brake shoe wear compensator 5 will move in an arc about the eccentric pin 24 until it engages edge 50 of the slot in member 48 (Fig. 3) after which further movement of said lever will rotate body 40 in a counter-clockwise direction on shaft 28, as viewed in Fig. 3. Shaft 28 is held against rotation in a counter-clockwise direction by pawl 33 or 34 in the lever 2, so that if lever 2 is rotated sufficiently in the counterclockwise direction, one or the other or both pawls 41 and 42 will pass over one or more teeth 31 on shaft 28 to lock the body 40 against rotation in a clockwise direction without turning shaft 28.

Supposing either or both pawls 41 or 42 have passed over one or more teeth 31 on shaft 28 and that fluid under pressure is released from chamber 17 of the brake cylinder device 1 for releasing the brake, spring 12 will move piston 10 and lever 2 to brake release position in which they are shown in Fig. 1. As lever 2 is returned toward its brake release position pinion gear 4 will be rotated counter-clockwise and by reason of engagement with sector 53 on lever 3, lever 3 will be rotated clockwise about pin 61 to move the brake shoe 7 to its brake released position.

Movement of lever 2 toward the brake release position will cause the lug 47 of the brake shoe wear compensator body 40 to be moved in an arc in a counter-clockwise direction about the eccentric shaft 24 until said lug engages edge 49 of the slot in member 48 and as lever 2 is then further moved by release spring 12, the body 40 will be turned in a clockwise direction as viewed in Fig. 3. Since pawl 41 or 42 has locked the body 40 to shaft 28, said shaft will also be turned in the clockwise direction with body 40 and the worm gear 25 will as a consequence be turned to effect rotation of pinion gear 4 in a clockwise direction relative to lever 2 and move lever 3 in a counter-clockwise direction to compensate for wear of the brake shoe 7 so that the braking face of said shoe will be positioned with respect to the housing 6 substantially the same as when the shoe is new.

It will be apparent that the compensator device 40 will operate as just described in effecting an application and release of brakes each time the wear of brake shoe 7 becomes sufficient for permitting movement of one of the pawls 41 or 42 to engage the next adjacent ratchet tooth 31. If the wear of the brake shoe is less, then the worm 25 will not be operated upon releasing an application of brakes, as will be apparent.

When replacing a worn-out brake shoe 7 with a new shoe, it will be necessary to readjust the lever 3 to the greater thickness of the new shoe. To obtain this adjustment, the operator will unlock the eccentric shaft 24 by operating the button 59, either manually or by use of a bar between said button and the cap nut 57 to pull the pin 55 out of said shaft and then by use of a suitable wrench in socket 52 in the end of said eccentric shaft, said shaft will be turned to a position in which pinion gear 4 is disengaged from the sector 53 thus leaving lever 3 free to be positioned as desired for receiving the new brake shoe 7. After the new brake shoe 7 is applied, the lever 3 will be positioned to space the shoe with proper clearance from the brake surface, and the eccentric shaft 24 will then be turned to the position for engaging the pinion gear 4 with the sector 53, in which position of pin 24 the lock pin 55 will, under action of spring 56, enter the bore in said shaft and lock said shaft in this pinion engaged position.

*Summary*

It will now be seen that we have provided a relatively simple, compact brake structure for mounting as a unit on a vehicle, and in which all wear parts are fully enclosed and protected from foreign matter to provide maximum life and efficiency with a minimum of maintenance and which structure includes means for automatically compensating for wear of the brake shoe and which is readily adjustable to a new shoe upon changing shoes.

Having now described the invention, what we claim as new and desire to secure by Letters Patent, is:

1. A unit brake apparatus comprising a housing adapted to be applied to a vehicle, a dead brake lever journaled in said housing and having a brake shoe operating end disposed outside of said housing, a live lever disposed and journaled in said housing, a brake cylinder piston disposed in said housing and connected to said live lever, means operatively connecting said dead lever to said live lever for operation thereby including brake shoe wear compensating mechanism for moving said dead lever relative to said live lever, and means arranged to cooperate with said housing for actuating said mechanism in response to greater than a chosen movement of said brake cylinder piston by fluid under pressure.

2. A unit brake apparatus comprising a housing, a dead lever fulcrumed in said housing and having an end disposed outside of said housing, a brake shoe carried by said one end of said lever, a gear sector on the other end of said dead lever, pinion means journaled in said housing engaging said sector for actuating said dead lever, a live lever in said housing for actuating said pinion means, a brake cylinder associated with said housing and including a brake piston for actuating said live lever, an automatic brake shoe wear compensator means disposed in the operating connection between said piston and said shoe, and manual means for readjusting brake shoe position when renewing said shoe.

3. A unit brake apparatus comprising a housing, a dead lever fulcrumed in said housing and having a brake shoe operating and disposed outside of said housing, a gear sector on the opposite end of said dead lever, pinion means journaled in said housing engaging said sector for actuating said dead lever, a live lever in said housing for actuating said pinion, automatic brake shoe wear compensator means disposed in said live lever for actuating said pinion for taking up brake shoe wear, means associated with said pinion means for disengaging said pinion means and said sector for readjusting brake shoe position, and a brake cylinder associated with said housing and including a brake piston for actuating said live lever.

4. A unit brake apparatus comprising a housing, a dead lever journaled in said housing and having one end disposed outside of said housing, a brake shoe carried by said one end of said lever, a gear sector on the other end of said lever, a pinion gear in said housing, eccentric means journaled in said housing carrying said pinion gear and rotatable to move said pinion gear into and out of driving engagement with said sector, means for locking said eccentric means in a position in which said pinion gear is in engagement with said sector and operative to render said eccentric means rotatable to a position for disengaging said pinion gear and said sector, a live lever in said housing for actuating said pinion, a brake cylinder associated with said housing and including a brake piston for actuating said live lever, and slack take-up means in said housing connecting said live lever to said dead lever.

5. A unit brake apparatus comprising a housing adapted to be applied to a vehicle, a dead brake lever journaled in said housing and comprising a brake shoe operating arm extending through an opening in said housing to the exterior thereof, resilient sealing means closing said opening around said arm, a live lever disposed and journaled in said housing, a brake cylinder piston in said housing connected to said live lever, a pinion gear operative by said live lever, and a gear sector on the end of the other arm of said dead lever engaged by said pinion gear.

6. A unit brake apparatus comprising a housing adapted to be applied to a vehicle, two anti-friction bearings carried by said housing, a dead brake lever journaled on one of said bearings within said housing and having a brake shoe operating arm extending through an opening in said housing to the exterior thereof, resilient sealing means closing said opening around said arm, a live lever disposed in and journaled on the other anti-friction bearing, a brake cylinder piston in said housing connected to one end of said live lever, a pinion gear carried by said other anti-friction bearing and operative by said live lever, and a gear sector on the end of the other arm of said dead lever in meshing engagement with said pinion gear.

ARTHUR J. BENT.
SAMUEL L. WILLIAMS.

References Cited in the file of this patent

UNITED STATES PATENTS

| Number | Name | Date |
|---|---|---|
| 1,589,434 | Schoenrock | June 22, 1926 |
| 1,594,463 | Ledbetter | June 22, 1926 |
| 1,661,191 | Midboe | Mar. 6, 1928 |
| 1,790,243 | Nilson | Jan. 27, 1931 |
| 1,887,832 | Brown | Nov. 15, 1932 |
| 2,062,748 | Golden | Dec. 1, 1936 |
| 2,095,753 | La Brie | Oct. 12, 1937 |
| 2,109,637 | Gutkaiss | Mar. 1, 1938 |
| 2,118,236 | Schwentler | May 24, 1938 |
| 2,165,985 | Schwentler | July 11, 1939 |
| 2,177,954 | Stewart | Oct. 31, 1939 |
| 2,294,974 | Freeman | Sept. 8, 1942 |